United States Patent [19]
Nichani et al.

[11] Patent Number: 5,673,334
[45] Date of Patent: Sep. 30, 1997

[54] METHOD AND APPARATUS FOR INSPECTION OF CHARACTERISTICS ON NON-RIGID PACKAGES

[75] Inventors: Sanjay Nichani, Newton; David Li, West Roxbury, both of Mass.

[73] Assignee: Cognex Corporation, Natick, Mass.

[21] Appl. No.: 565,500

[22] Filed: Nov. 30, 1995

[51] Int. Cl.$^6$ .................................................. G06K 9/00
[52] U.S. Cl. ........................... 382/143; 348/95; 382/287
[58] Field of Search .................................. 382/143, 287, 382/289, 291, 151, 216, 318, 297; 358/488; 250/557, 561; 348/88, 91, 94, 95

[56] References Cited

U.S. PATENT DOCUMENTS

| | | | |
|---|---|---|---|
| 4,200,861 | 4/1980 | Hubach et al. | 382/216 |
| 4,233,625 | 11/1980 | Altman | 382/151 |
| 4,794,648 | 12/1988 | Ayata et al. | 382/287 |
| 5,101,448 | 3/1992 | Kawachiya et al. | 382/287 |
| 5,134,669 | 7/1992 | Keogh et al. | 382/318 |
| 5,504,319 | 4/1996 | Li et al. | 382/318 |
| 5,555,101 | 9/1996 | Larson et al. | 382/287 |
| 5,579,419 | 11/1996 | Yaguchi et al. | 382/297 |

*Primary Examiner*—Joseph Mancuso
*Attorney, Agent, or Firm*—Brian L. Michaelis; Russ Weinzimmer

[57] ABSTRACT

A method and apparatus to search, locate and inspect an object or characteristic of interest on a non-rigid package. First, a model of patterns of interest are stored to train the system with a model of the characteristics of interest. A minimum spanning forest (MSF) is generated defining the characteristics of interest as vertices with each vertex referencing a vertex closest to itself in order to minimize the sum of the distances between vertices in each minimum spanning tree (MST) of the MSF. At run time two coarse alignment features that the system has been trained to identify are located to determine rotation and coarse position of a non-rigid package being inspected. Local alignment then determines the exact position of local alignment points each of which is a starting vertex associated with one or more characteristics of interest as vertices in that starting vertexes MST. When the exact position of each local alignment point is determined the approximate position of associated characteristics is then known. Fine alignment determines the exact position of the characteristics of interest. The fine alignment process uses the minimum spanning forrest ("MSF") to locate each characteristic of interest in a selected order by reference to another, nearest, previously located characteristic.

10 Claims, 8 Drawing Sheets

FIG 2
(prior art)

METHOD AND APPARATUS FOR INSPECTION OF CHARACTERISTICS ON NON-RIGID PACKAGES

FIELD OF THE INVENTION

The present invention relates to automated vision systems, and more particularly to an automated vision system for inspecting characteristics, such as check boxes, on non-rigid packages.

BACKGROUND OF THE INVENTION

Automated vision systems are known for providing "machine vision" capabilities in manufacturing and other automated processes and applications involving vision tasks that exceed the speed and precision of human vision. Machine vision systems are presently in use in automated processes providing improved productivity and quality, in various industries including the semiconductor, electronics, automotive, aerospace, printing and food processing industries. Machine vision systems provide, among other things, an automated capability for performing diverse inspection, location, measurement, alignment and scanning tasks.

A typical automated or machine vision system is comprised of hardware and software components. The hardware components generally include some image acquisition capability in the form of a video camera or other imaging device which acquires and transmits an image to processing hardware, usually as an analog signal. The processing hardware includes digitizing circuitry to capture the image input from the imaging device and digitize the image at a high resolution to produce a digital image comprised of discrete picture elements or pixels. The digitized image in the form of pixel information can be stored, manipulated and otherwise processed in accordance with capabilities of the vision system.

A microprocessor or CPU portion of the machine vision system processing hardware executes software that processes the pixel information in accordance with a particular vision application. The CPU may also act as a general purpose computer and run software to generate statistical reports, provide specialized user interfaces, and/or control other elements of an automated manufacturing system. The CPU has associated memory and may have capabilities for displaying images and/or storing application programs, images, and other data on external storage devices such as floppy disks or other mass storage devices. The vision system may also include, in conjunction with the CPU, a co-processor or dedicated hardware that can handle high speed, complex manipulation of the digitized image(s).

The CPU and/or co-processor typically run vision software and application software to effect functionality of the machine vision system in the context of its particular implementation. For instance, if the machine vision system is implemented in an automated process to locate and measure the area of an object, vision application software will be run to "train" the system, using a "model" of the object, to identify a pattern that matches the object to be measured within a "window" or portion of a field of view of the camera or image acquisition device. Software will effect capture of an image as it passes through the field of view of the camera or image acquisition device and locate the object of interest in the captured image. Other software will measure the object's area and may effect some result such as issuing an alarm to alert an operator to a problem, or issuing a signal that causes the part to be diverted to another process step.

Machine vision systems are implemented in myriad other applications and may be configured as general purpose systems incorporating "off-the-shelf" vision software flexibly configured for a variety of applications, or systems may be tailored to a particular application and include vision software components dedicated to the specific application.

Difficulties arise in implementing automated vision systems to perform vision tasks on certain types of objects. Problems are encountered in the inspection of non-rigid packages which are contorted. In situations wherein it is desirable to inspect a plurality of check boxes or locate patterns on a non-rigid package, the positioning and shape of the boxes or patterns on the package will change if the package is contorted due to its non-rigidity. Additionally, undesirable shadowing on the contorted package surface makes inspection of the check boxes difficult. Existing vision systems can be trained to inspect a particular package, locate a box thereon and determine if there is a change in the box, such as a check mark. However, in implementations where the surface of a non-rigid package is inspected for check boxes or patterns thereon having particular content, such as a check mark, errors may be introduced due to non-rigidity and resultant contortions in the non-rigid package.

In one example, in an automated film package processing implementation known in the prior art, film for automated processing is packaged, usually by the customer, in flexible film packages or envelopes, as illustrated in FIG. 1. The envelopes are used to deposit film of various types (e.g. color print, slide, black & whir& etc.), sizes (e.g. 35 mm, 110, 126, etc.), and quantity of exposures (e.g. 12, 15, 24, 36). A single roll of film is deposited in an envelope, and appropriate information as to type, etc, is indicated by the customer on the envelope by marking respective boxes. In a high volume automated process it is desirable to have a mechanism at the front end to sort the packages in accordance with the particular indicia in order to divert the packages to the appropriate subsequent processing step. It would be very undesirable, and cost prohibitive, to require dedicated envelopes for each of the various combinations of types, sizes and number of exposures. It is desirable to have one envelope type to deposit any of various types, sizes etc., of film, and to have the envelope(s) inspected by a machine vision system.

When film is enclosed in the package the surface of the envelope becomes contorted. A machine vision system used to inspect the boxes for check marks will produce errors when the package is contorted in such a way as to make it difficult for the vision system to locate and properly inspect the appropriate boxes. Specially designed envelopes have been made in an attempt to limit the extent of contortion and/or make the contortion more predictable in order to simplify the machine vision task. Some specially designed envelopes have included a "pocket" to retain the film in a fixed location within the envelope while positioning the check boxes on a surface of the envelope as far from the contorted portion as possible. However, such an approach has not solved the machine vision problem. Furthermore, the costs involved in redesigning and acquiring specialized envelopes makes such a potential solution undesirable.

Other approaches to overcoming the difficulties associated with using machine vision in the inspection of non-rigid packages, also in the context of automated film processing, have involved the use of standardized, dedicated package markings. A single package type, of a plain, non-fanciful design has been implemented including standardized surface markings. As illustrated in FIG. 2., prior art processes have incorporated non-rigid packages that include uniform fiducials 20, or alignment marks. Fiducials provide landmarks proximate to the boxes to be inspected by the vision system, and act as reference points from which a traversal of the image is initiated with the ultimate objective of locating each of the boxes in a position relative to the local alignment point or fiducial.

Fiducials provide a feature on the package surface which will provide the basis for a coarse alignment and/or local alignment of the vision system as it processes an image to locate a visual entity, such as a box, for inspection. Having been trained as to the location of the fiducial(s) and as to the location of the boxes in reference to the fiducial(s), using a model of the single package type to be inspected, a machine vision system can then search for the boxes and make a determination as to the status of the boxes, e.g. checked or unchecked.

As illustrated in a graph of a fiducial based inspection in FIG. 3, such prior art vision systems generally first locate a coarse alignment fiducial 22 which provides a reference from which to locate a local alignment fiducial 24. Each of the boxes 26, 28, 30, 32, 34, 36, 38, and 40, can then be located serially based on a reference from the local alignment fiducial 24. That is, a first box 26 is located based on the local fiducial 24 as a point of reference, a second box 28 is then located based on the local fiducial 24 as a point of reference, then a third box 30 is located based on the local fiducial 24 as a point of reference, etc., until all of the boxes are located. After each box is located using the local alignment fiducial 24 as a reference, a determination can be made as to which boxes include a check mark.

As discussed hereinbefore, warping of a non-rigid package surface creates difficulties in ascertaining the position, shape and content of check boxes as the package surface gets contorted due to film disposed in the package. Local alignment fiducials can be used to locate some of the check boxes, especially those closest to the fiducials, however, boxes which are further away from the fiducials may be difficult or impossible to find due to surface contortions causing errors and diminishing the integrity, i.e. efficacy, of the automated inspection system. Standardized fiducials also severely limit the aesthetic nature of the envelopes.

In addition to the fact that such known vision system implementations are limited in that they require a uniform, standardized, non-fanciful package or envelope, and may require a pocket or dedicated portion to limit position of the contents inside the package, the search methodology implemented introduces significant inefficiencies. Serially locating each of the boxes based on its respective position relative to a local alignment fiducial, as illustrated in FIG. 3, substantially increases the likelihood that boxes located farthest from the local alignment fiducial will not be located, or will produce an erroneous indication that the box is checked.

SUMMARY OF THE INVENTION

The present invention provides a method and apparatus for performing high integrity, high efficiency machine vision inspection of non-rigid packages without limiting the variety of packages, or type of markings on the packages. No special or dedicated fiducials are required for locating and inspecting package surface characteristics, such as boxes and/or check markings, in an efficient, high integrity vision inspection system according to the invention.

A vision system for inspecting non-rigid package surfaces, according to the invention, incorporates a search methodology that involves training the system to locate and inspect characteristics of interest, such as check marks in check boxes, on a variety of package types. A minimum spanning forest is constructed and used to determine an optimized order in which the check boxes are found and inspected, so as to minimize the effects of warping of the non-rigid envelope. The machine vision system search methodology includes an hierarchical alignment mechanism involving a coarse alignment, a local alignment and a fine alignment. A coarse alignment process is initially used to determine the location of a coarse alignment characteristic of the entire package. A local alignment process determines the exact position of local alignment points on the package. Each local alignment point is associated with one or more geographical groupings of characteristics of interest, e.g. check box(es), and when the exact position of each local alignment point is determined the approximate position of respective characteristics or check boxes associated with the local alignment point is then known. A fine alignment process is used to determine the exact position of the characteristics/boxes of interest. The minimum spanning forrest ("MSF") is used to locate each characteristic/box of interest in a selected order by reference to another, nearest, previously located characteristic/box. Locating each surface characteristic by reference to another nearest characteristic as defined in a minimum spanning forrest effects a highly efficient search by minimizing the sum of the distances between the surface characteristics, and thereby minimizing the effects of warping.

In an embodiment for surface inspection and analysis for marks in boxes, a check mark detection mechanism involves a scoring scheme wherein a box is determined to be checked based on whether a score resulting from computation of three parameters associated with each box is exceeded. The score for each box is based on computation of an average of grey scale values inside the box (average value), the number of edges in the box (edge count), and a shape value which compares a value or score for the located box (on a scale from 0 to 1000), against a score for a model box inspected during training (a score of 1000 is a virtual match with the trained box). The determination of whether the box is checked or not is based on its score computed based on the three parameters (grey scale value, number of edges, shape value).

Features of the invention include high speed, high integrity inspection and analysis of surface characteristics of a non-rigid package. The method and apparatus can be applied to a variety of packages including packages having fanciful graphic designs on the surface to be inspected. Low inspection times and low error and failure rates are achieved in an automated inbound inspection and sorting system, such as implemented at the front end of an automated film processing system. The method and apparatus according to the invention overcomes deficiencies in the prior art and provides a high integrity inspection mechanism using one camera.

BRIEF DESCRIPTION OF THE DRAWING

These and other features of the present invention will be better understood in view of the following detailed description taken in conjunction with the drawing, in which:

Figure 2:
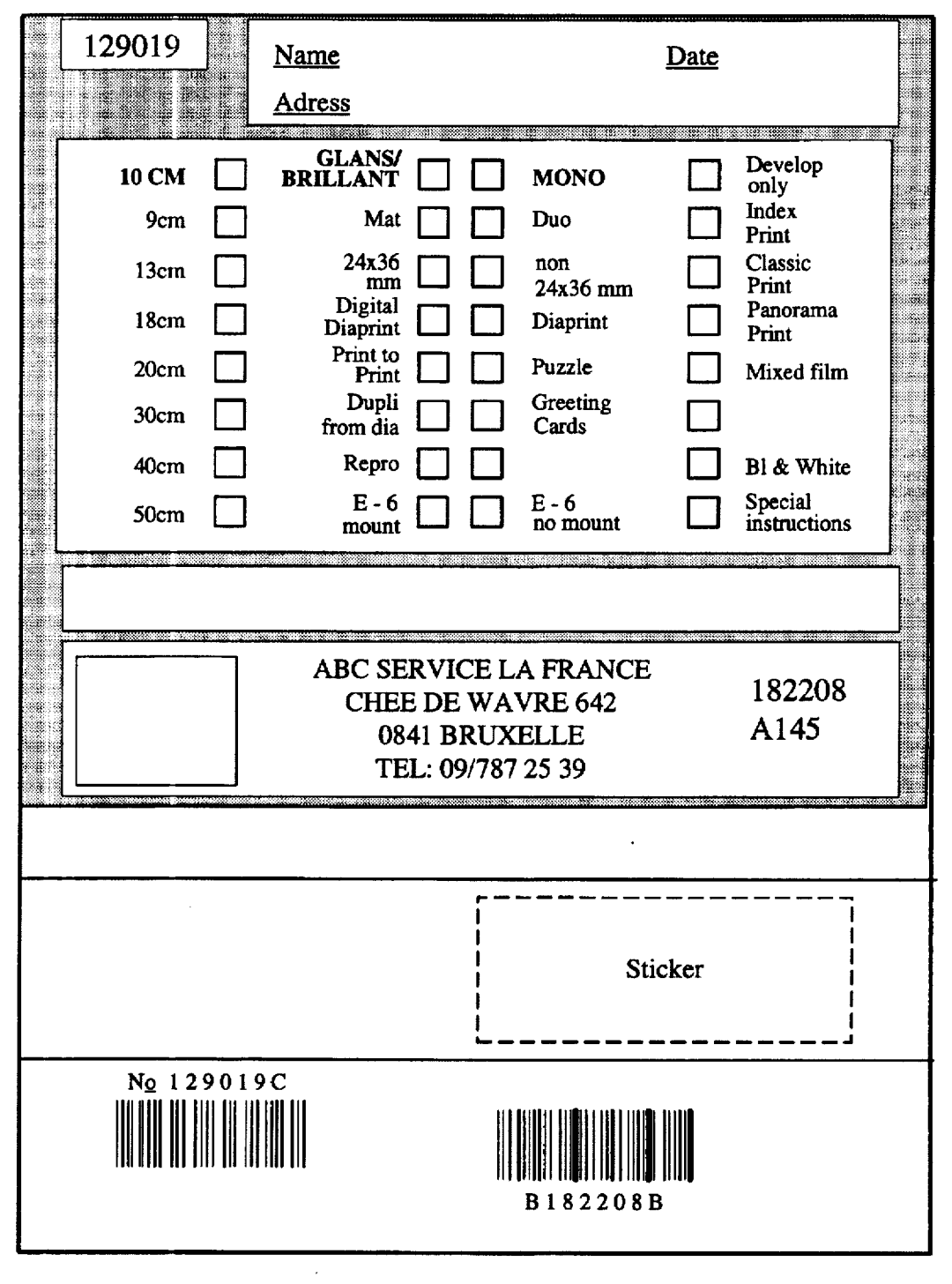

FIG. 2 is an illustration of a surface of a non-rigid film package or envelope designed to facilitate machine vision and including fiducials to facilitate inbound automated sorting in a photo lab prior to film processing;

DETAILED DESCRIPTION

An illustrative embodiment of the present invention is described hereinafter in the context of a vision system to inspect photo packages and report the status of various check boxes on the non-rigid photo packages, e.g. in an automated process for inbound sorting in a photo lab prior to film processing. The image processing according to the invention and described hereinafter can be implemented using machine vision systems and tools such as available with the Cognex 2000, 3000 and 4000 Series machine vision systems that provide object location and recognition technology, and which are available from Cognex Corporation, Natick, Mass.

Figure 4:
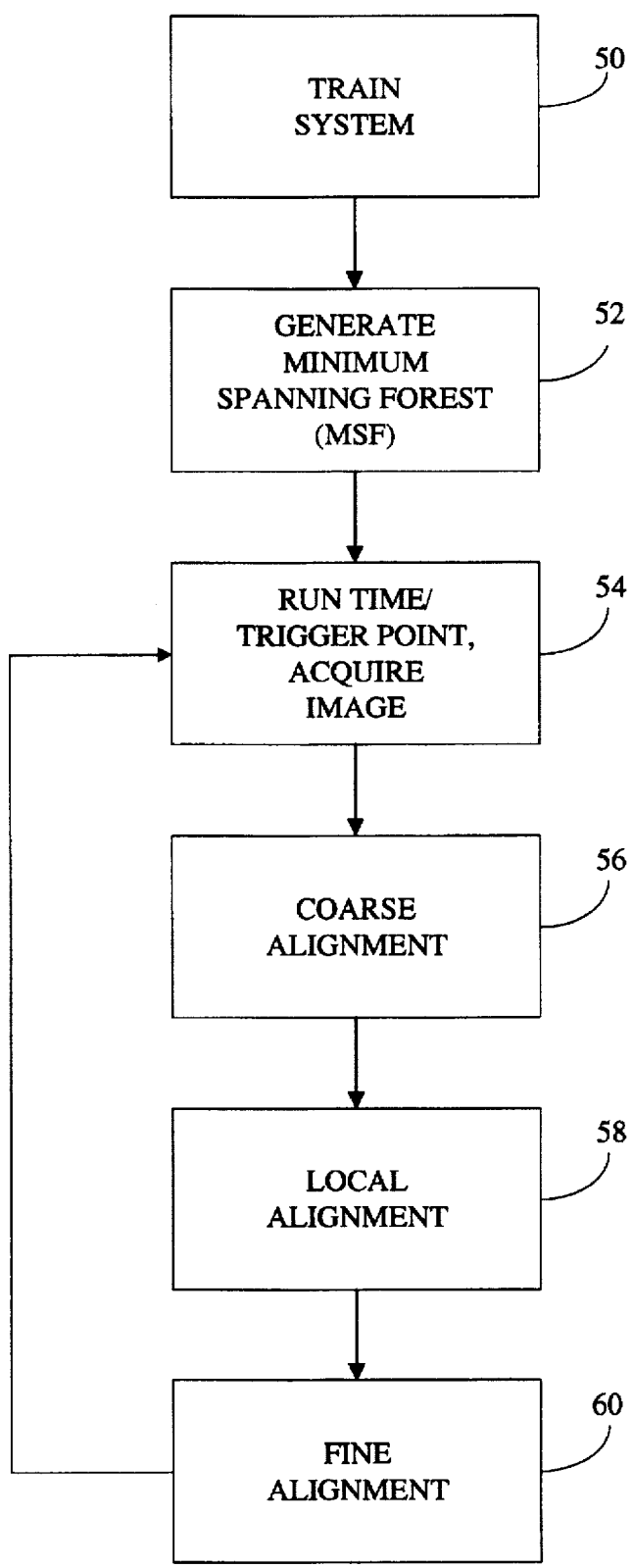
FIG. 4 is a functional block diagram generally illustrating steps in a process, according to the invention, of searching for characteristics of interest on a surface of a non-rigid package.

Referring now to FIG. 4, which provides a general overview of a process according to the invention, in order to search and locate an object or characteristic of interest, according to the invention, using any of various known machine vision systems and tools, it is necessary in a first step 50, that an operator first store a model of the pattern(s) and other information of interest in the vision system's memory or in a storage device accessible to the vision system. The information stored is assembled in a data structure, as discussed in detail hereinafter, including the pattern, the position of the pattern and the number of patterns. After the system is trained with the characteristics of interest, a minimum spanning forest (MSF) can be generated 52 which establishes the sequence or order in which aspects of the pattern of interest are searched. At run time, the vision system is prompted by a trigger mechanism 54, such as a make-or-break sensor, a microswitch, or light beam switch or the like, which indicates to the system that the subject of the machine vision inspection is within the field of view of the image acquisition device (i.e. camera). Generally, coarse alignment 56 determines the location of at least one coarse alignment characteristic facilitating determination of information regarding the translation and/or rotation of the object being inspected. The coarse alignment point(s) is typically in the vicinity of local alignment points of interest. Local alignment 58 then determines the exact position of local alignment points which are each associated with one or more characteristics of interest, e.g. check box(es). It should be noted that the exact position of check boxes is not obtained by coarse or local alignment. When the exact position of each local alignment point is determined the approximate position of respective characteristics or check boxes associated with the local alignment point is known. Fine alignment 60 determines the exact position of the characteristics/boxes of interest. The fine alignment process uses the minimum spanning forrest ("MSF") to locate each characteristic/box of interest in a selected order by reference to another, nearest, previously located characteristic/box.

Training

Figure 5:
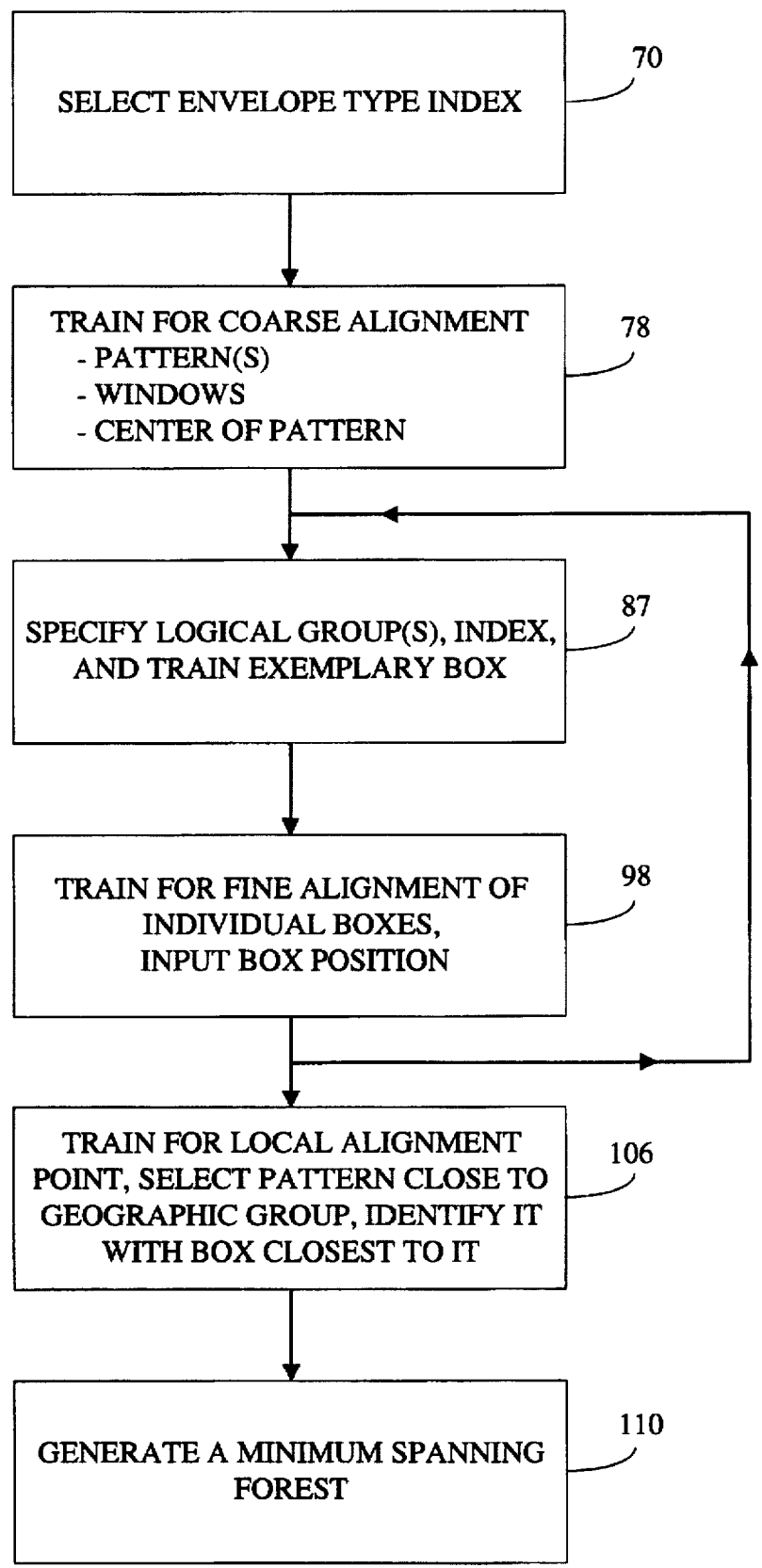
FIG. 5 is a flow diagram illustrating training of a vision system according to the invention.

In an illustrative implementation using Cognex machine vision tools, the system is trained, as illustrated in the flow diagram of FIG. 5, to locate characteristics of interest for the coarse, fine and local alignment processes. To train or capture and store a model of a pattern of interest within an image, the image or field of view of the camera with a sample of the object to be inspected is captured and displayed on a monitor. The model, or some aspect of the object to be inspected, is isolated within the image and stored. The process is very user friendly and merely involves manipulating a trackball to draw a box around the area within the image that is to be used as a model. At the click of a button the model pattern is stored in memory.

Figure 1:
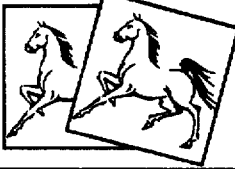
FIG. 1 is an illustration of a surface of a non-rigid package for depositing film for inbound automated sorting in a photo lab prior to film processing.
Figure 3:
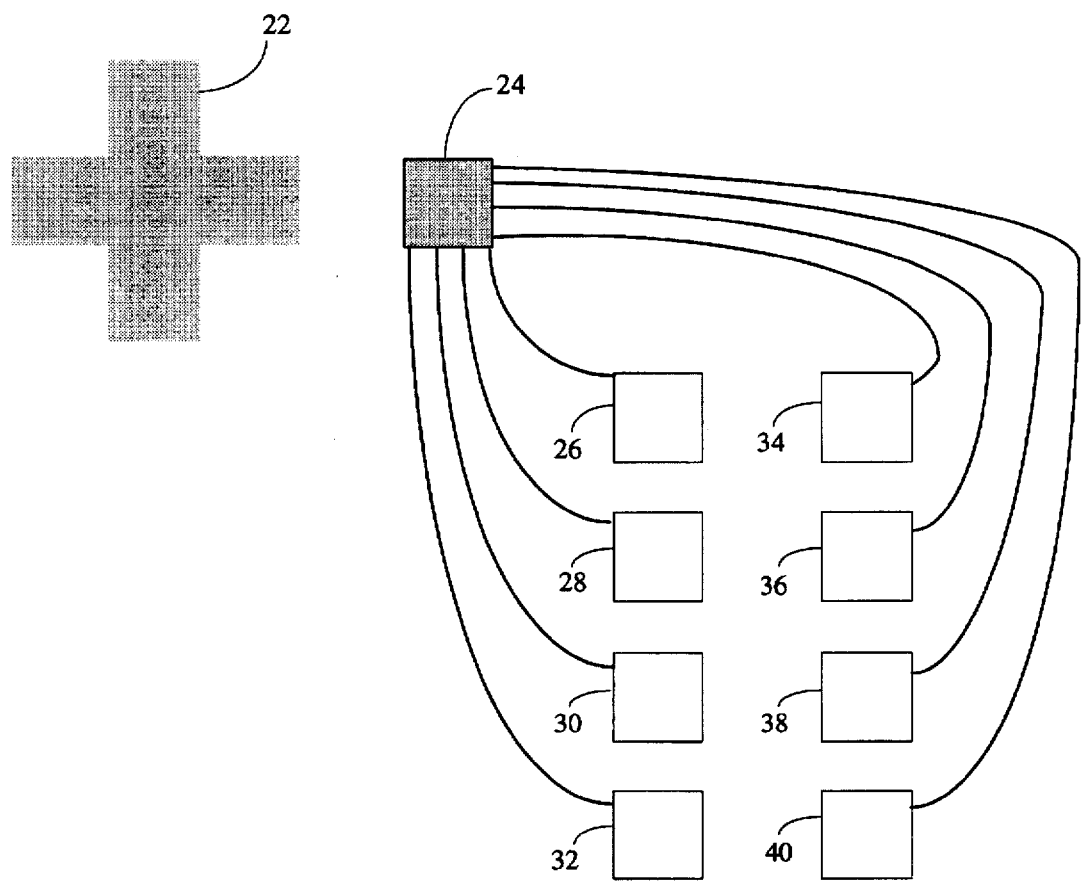
FIG. 3 is a diagrammatic illustration of a graph representing a search according to the prior art, based from a coarse fiducial and local alignment point.
Figure 6:
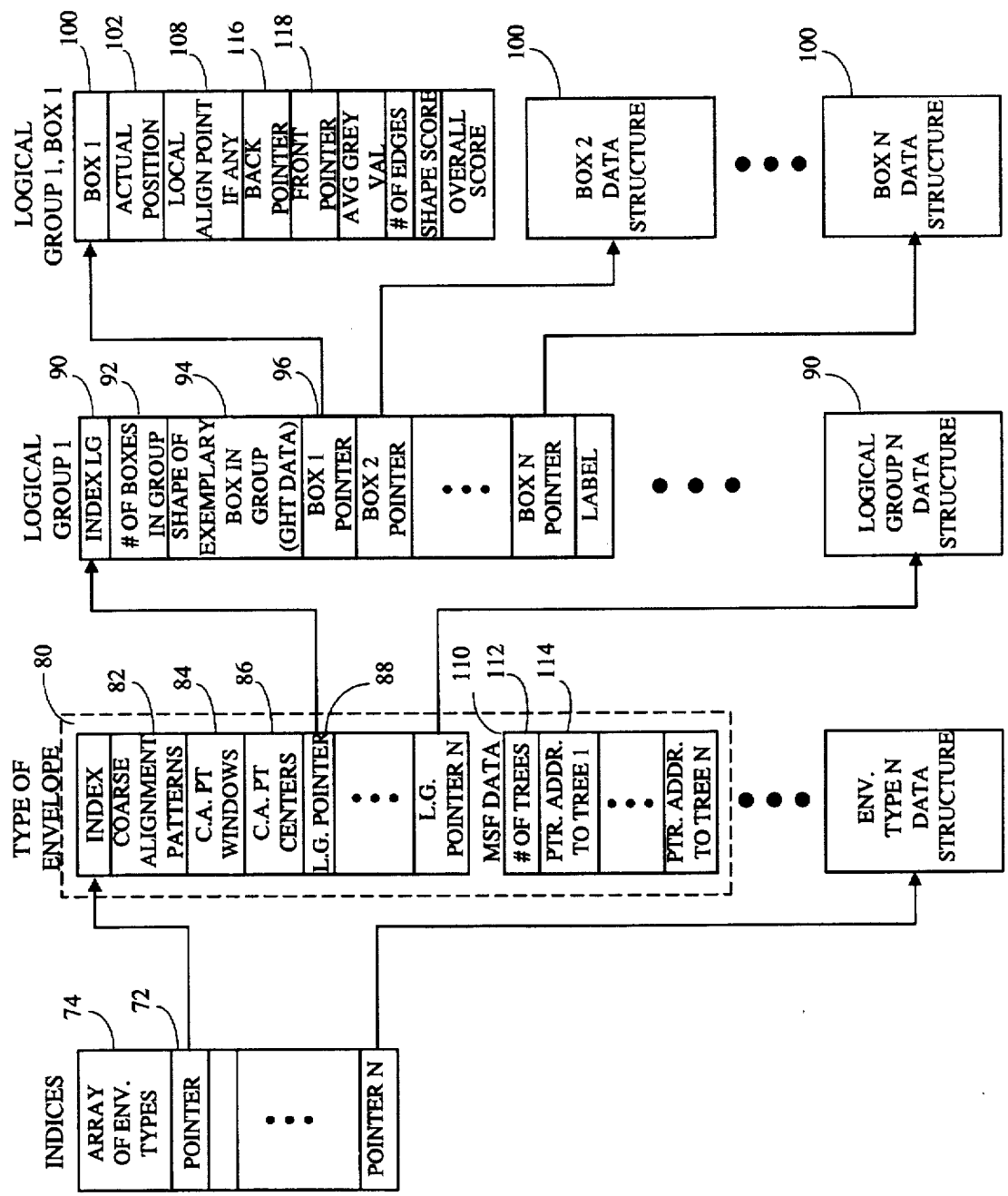
FIG. 6 is a diagrammatic representation of a data structure constructed in the process and apparatus according to the invention comprising information defining characteristics of interest.

In the present illustrative embodiment the object of interest to be inspected by the vision system according to the invention is a surface of a non-rigid photo envelope containing a plurality of boxes thereon, e.g. as in FIG. 1. Training in the present illustrative embodiment involves constructing a training data structure, as illustrated in FIG. 6, comprised of information involved in the hierarchical alignment processes used to locate and inspect the characteristics of interest, as described in detail hereinafter. In training the system, a variety of envelope types including check boxes of arbitrary shapes and sizes can be trained. Each envelope type must be uniquely indexed 70 so that the parameters or information stored during training are associated with that specific envelope type through its index. The envelope index provides an envelope type identifier that typically will be implemented in a bar code on each envelope and scanned to identify the envelope type prior to the triggering of inspection. As illustrated in FIG. 6, assigning an envelope index basically designates a location 72 within an array 74 into which is stored a pointer to information about the particular envelope type trained. Space in the array 74 is dynamically allocated and will be a function of the number of various types of envelopes which the system is trained to process.

Each of the boxes on the envelope represents an object or characteristic of interest that must be located at run time and inspected to determine if the box is checked. Due to the fact that the photo packages at run time have both translational and rotational uncertainty, the position of the check boxes on the photo package is also uncertain. The translational and rotational position of the package, relative to a reference image obtained during training, should first be determined in order to facilitate the search for the object(s) of interest. Coarse alignment effects a determination of rotational position by implementing a process referred to as "two point fixturing", which is used to determine the rotational position of the envelope and the coarse location of the check boxes. Two point fixturing is a search by the vision system for two points, which when found, fix the translational and rotational position of the package for further processing. During run time, when the two points are found the translational and rotational position of the package will be known and a coarse location of the boxes relative to the two fixed points can be determined.

Two point fixturing involves selecting two unique points or two unique patterns on the package and using those two points as models at train time to train for coarse alignment 78. The two unique patterns for which the system is trained to perform coarse alignment should be as far apart as possible to minimize errors that might occur as a result of changes in the contour of the non-rigid package. Generally, it is preferable that they be diagonally disposed on the envelope in the field of view. The two point fixturing patterns selected should be unique with respect to their background, low frequency in terms of their spectral decomposition and rotationally insensitive. Low frequency patterns are smooth patterns that do not have a lot of edges, as known in the art of machine vision. For example, corners, circular disks, and faces of figures make very good patterns. The two point fixturing patterns selected should also not be too close to the edge of the field of view.

The position of each of these coarse alignment models or fixturing points is stored at train time 78 for use at run time with a normalized correlation mechanism that is used to locate the points for coarse alignment. In the illustrative embodiment of the invention wherein Cognex machine vision tools are implemented, coarse alignment points are used with the Cognex Search normalized correlation mechanism during run time. It may be desirable to select a third point to be stored at train time, to be used as a backup point in the event that a pattern on the run time envelope corresponding to one of the two coarse alignment fixturing points is not found. The first two of the coarse alignment points entered at train time will be used for two-point fixturing and the system will not use the third one trained unless it is required as a back-up.

When the coarse alignment points are trained, as described hereinbefore, an envelope data structure 80, such as an array, associated with the index for that particular envelope type is created as part of the training data structure, illustrated in FIG. 6. The coarse alignment point patterns 82 are stored in the envelope data structure 80. A window 84 in which each of the patterns lies is stored along with the patterns 82 in the envelope data structure 80. The windows stored at train time provide respective limited areas of search for each of the coarse alignment patterns. The trained windows to be searched within the field of view, limit the extent of area searched and expedite the process of locating the coarse alignment patterns. These coarse alignment pattern areas of search should be selected to be big enough to accommodate the uncertain orientation of the package at run time. A center location 86 for each of the patterns within its respective window is also stored in the envelope data structure to provide information at run time about the location of the center of the coarse alignment point patterns.

On the non-rigid film package (e.g. see FIG. 1), as in other applications, check boxes may be associated in groups (e.g. See "FILM SIZE", FILM TYPE, etc.), or a box or boxes may be set apart from other boxes or groups (e.g. See "CHECK HERE IF YOU PREFER MATTE"). In training the system, check boxes may be logically grouped or associated for purposes of run time analysis. Logical grouping typically is related to a relationship between the logically grouped boxes which dictates that only one of the boxes of the logical group will be checked. During run time, each logical group of boxes is inspected to determine which one box in each of the groups of boxes is checked. Each set of distinct check boxes (e.g. "FILM TYPE" in FIG. 1), is therefore associated as a "logical group," during training 87, not necessarily in accordance with the proximity of the boxes to each other. Each logical group is identified with a logical group index 88 or pointer that is input and stored in that envelope's data structure 80.

The logical group index or pointer 88 points to a logical group data structure 90 portion of the training data structure, that is a repository for information acquired during training and provides reference information for a respective logical group of boxes during run time. Specifically, the number of check boxes 92 in a logical group is input to the system and stored in the logical group data structure 90. An exemplary shape or contour 94 of one of the boxes in the logical group is trained and stored. The trained box shape is used during fine alignment at run time in a Generalized Hough Transform (GHT) mechanism to locate the contour of the trained shape. In the illustrative embodiment wherein Cognex machine vision tools are implemented, training for fine alignment will be used at run time by the Cognex Contour Finder GHT mechanism. In addition to the exemplary box shape for the logical group, identifiers or pointers 96 to each of the individual boxes associated in the logical group are designated and stored in the logical group data structure 90.

The pointers 96 to each of the individual boxes, actually point to individual box data structures 100 which will contain information about a respective box obtained during training for fine alignment 98 (e.g. its train time position and any associated local alignment model), and information about that respective box obtained during generation of a minimum spanning forest (e.g. minimum spanning tree front and back pointers) and during run time (e.g. scoring parameters), as discussed hereinafter. During fine alignment training, the actual position 102 within the image, of each box in the logical group is acquired and stored in its respective individual box data structure 100.

Other information relating to each individual box will be determined and stored in the individual box data structure 100 as local alignment points are trained and associated with respective individual boxes within geographically associated groups. Local alignment is part of the hierarchical searching methodology for machine vision inspection of non-rigid packages according to the invention, that is effected to geographically associate characteristics/boxes of interest, as opposed to the logical association effected during training of logical groups. Geographically related boxes, i.e. boxes in relative geographic proximity to each other in an area of the envelope, are associated by designating a local alignment point or distinctive pattern that is closest to that group of boxes. The local alignment point pattern is trained 106, like the coarse alignment points, by isolating a selected local alignment point pattern and storing it as a model. The selected local alignment point pattern and position of that pattern is stored 108 in the data structure of the individual box that is specified as being geographically closest to that local alignment point, and will be used during run time by the normalized correlation mechanism (Cognex Search), as discussed hereinafter. Typically, one local alignment point is selected and trained for each geographical grouping of boxes. Each local alignment point serves the purpose of providing a local reference or reference in a particular area local to characteristics of interest, i.e. check boxes, to accommodate localized warping of the non-rigid package or warping of the package in a local area.

After specifying and training for a logical group and training for fine alignment and for local alignment point(s) associated with any geographical grouping(s), the process is repeated for other distinct groups of check boxes forming logical and/or geographical groupings. With the training of each logical group, etc., the training data structure as illustrated in FIG. 6 is constructed. Additional information will be determined and incorporated into the overall data structure upon generation of a minimum spanning forest and during run time, as described hereinafter.

By training the vision system with the position of the check boxes on a model envelope at train time, and by knowing the rotational and translation parameters of the subject package at run time relative to the train time image, it is possible to determine the position of the check boxes in the run time image. In order to process the boxes most efficiently at run time according to the invention, i.e. to locate each individual box and inspect it, a minimum spanning forest is generated 110.

Minimum Spanning Forest

A minimum spanning forest is constructed after training, to build into the data structure the inter-relationships between the boxes on the non-rigid package and to relate the boxes as vertices in a graph. Ultimately, the inter-relationships established in building the data structure (FIG. 6) determine the order in which the boxes are found and inspected during run time processing. The minimum spanning forest (MSF or "forest") constructed after training the system will include a minimum spanning tree (MST or "tree"), as known in the computer science art, for each local alignment point. Each box that is associated with a local alignment point, i.e. is closest to a local alignment point so as to have that local alignment point modelled in its individual box data structure, is a starting vertex or root for a MST in the MSF. If there are no local alignment points, e.g. for a non-rigid package where all the boxes to be inspected are proximate to one-another and to a coarse alignment point, then the first box trained is the starting vertex, or any other arbitrarily selected box may be designated as the root. The boxes in a geographical group are vertices associated with the respective starting vertex/root. Each MST is constructed so that each check box/vertex derives its reference from a known point closest to it, to minimize the sum of the distances between the check boxes/vertices and thereby minimize the effects of warping of the non-rigid package. The reference, as discussed in greater detail hereinafter, is used to compute an estimated run time position of a box based on the train time and run time positions of the known point or box closest to it.

Part of the information comprising the data structure constructed during training is used as a MSF is constructed. In particular, the logical relationships established among distinct groups of boxes is used to uniquely identify the boxes in constructing the MSF. For example, one particular box on an envelope is identified as box 1 of logical group 1, another as box 2 of logical group 1 and another as box N of logical group 1, etc. Furthermore, the exact position of each of the boxes in the image of the trained envelope is known and stored during training and can be used in constructing the MSF.

As the MSF is constructed by a MSF building mechanism according to the invention, information from the data structure will be used and further information will be stored in the data structure. A MSF portion 111 of the envelope type data structure 80 is created and filled with information derived during generation of the MSF. The MSF building mechanism is basically a software module in this implementation that processes the data in the training data structure and constructs a MSF constituted by a plurality of trees constructed according to a MST algorithm known in the computer science art.

Initially, in order to build the MSF the number of trees that will constitute the MSF must be determined. Again, each local alignment point serves as a root of a tree, so the number of trees can be determined by processing the individual box data structures to obtain local alignment point information. In an alternative embodiment, the number of trees can be manually input. In any event, the number of trees 112 must be known and stored in the MSF data structure 110.

Figure 7:
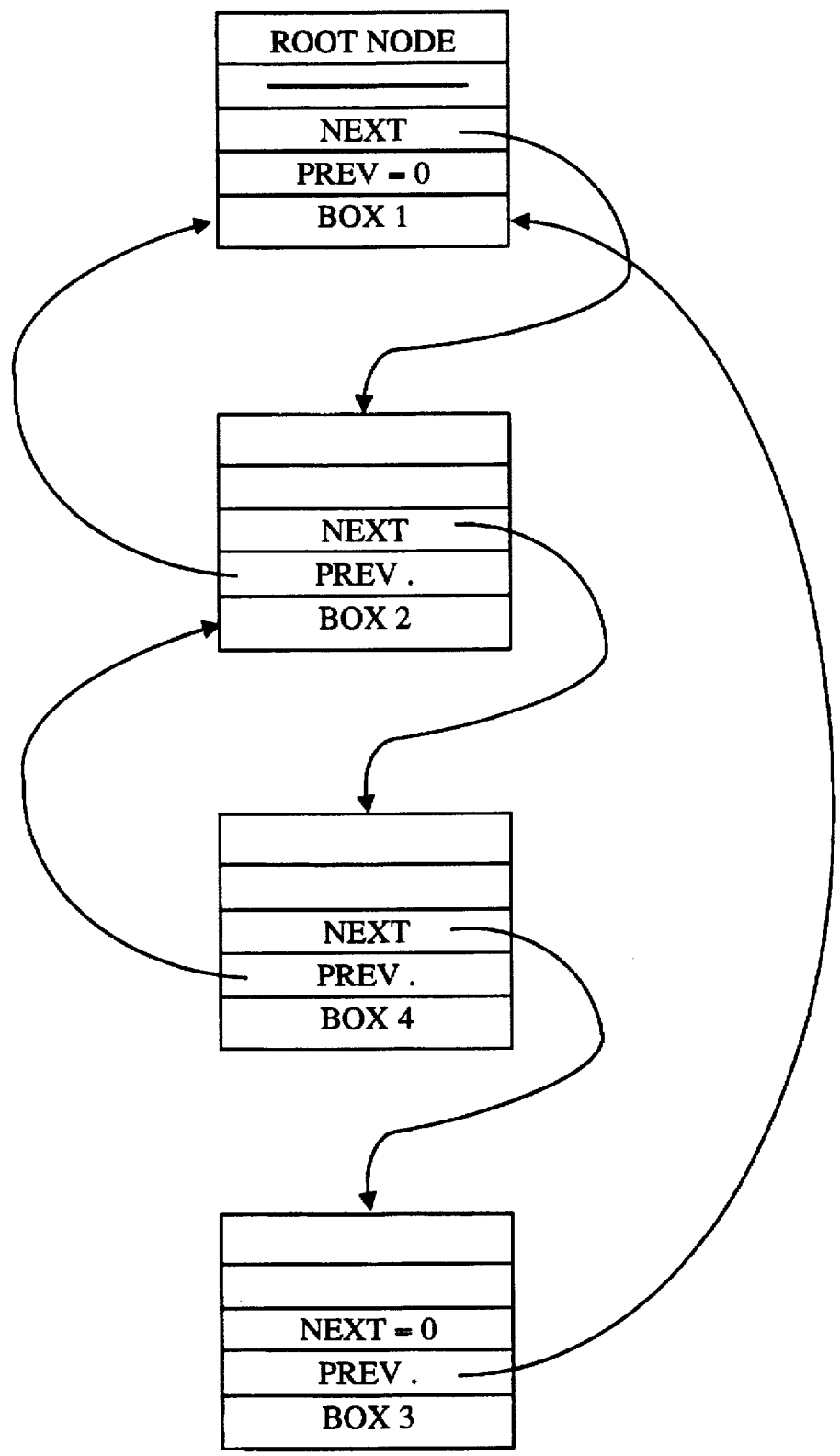
FIG. 7 is an abstraction illustrating a Minimum Spanning Tree effected with a one dimensional linked list.

A pointer address 114 to each MST, which is in actuality a pointer to the address of the root box of the respective tree, is also stored in the MSF data structure 110. That is, each pointer address 114 points to a respective MST by pointing to the root box of a respective tree. Each MST, in this illustrative embodiment, is a doubly linked list, as illustrated in FIG. 7, formed by pointers stored in the individual box data structure(s) 100, as described hereinafter.

The MSF building mechanism processes the local alignment point information in the individual box data structures 100 to determine the position of each local alignment point. Each local alignment point encountered is associated with a box that then becomes the root of a respective tree. The individual box data (in the individual box data structure 100) is further processed to determine the box that is positioned in the image having the minimum distance to any one of the roots. That box having the minimum distance to any one of the roots is then associated in the tree of that root to which it is closest. The remaining boxes, i.e. excluding the root boxes and the one(s) linked in a tree are further processed to determine the next box that has the minimum distance to any one of the roots and/or boxes associated in a tree. That next box is then associated in the tree of that box to which it is closest. Remaining boxes are processed until all of the boxes are linked in a tree.

As each box is processed the linked list or tree is constructed. Although FIG. 7 illustrates an abstraction of the construct, it should be noted that no construct apart from the data structure of FIG. 6 is required to effect the tree. The tree is effected by pointers stored in fields in the individual box data structure 100. Each element 120 in the tree or linked list 122 represents a box in the geographic association of boxes established relative to a respective local alignment point, each box having been previously defined and logically related in the training data structure illustrated in FIG. 6.

The MST is implemented in the form of a doubly linked list with a previous box pointer 116 and a next box pointer 118. When a box is added to the list or tree, it is added sequentially into the list as a next box pointer of the previous box or last box previously entered. However, the previous box pointer 116 or back pointer, which in the new box entered points to the previous box, is the pointer that is actually used to provide the reference. That is, the box is attached in the tree by its previous box pointer 116. As the tree is processed during run time the next box pointers 118 provide the order of execution or search and inspection, effecting a depth first traversal of the tree. However, the back pointer or previous box pointer gives the box its reference, i.e. points to the box that is closest to it and used to estimate the position of the box during search and inspection. At every step when the tree is constructed, each box is attached to a box closest to it in order to minimize the sum of the distances between the boxes, and thereby minimize the effects of warping of the non-rigid package.

With the system trained for coarse and fine alignment, with the local alignment points trained, and having generated the minimum spanning forest to provide references for each box based on a closest known point, the vision system is configured to process non-rigid packages in a high integrity inspection for characteristics of interest, i.e. check marks in check boxes.

Run Time Inspection

A hierarchical fixturing scheme involving coarse alignment, fine alignment and local alignment is effected during run time inspection of the non-rigid packages as they are inspected by the automated vision system according to the invention.

Coarse Alignment

As discussed hereinbefore, the translational and rotational position of the package, relative to a model, should first be determined in order to facilitate the search and inspection of the check boxes. Coarse alignment effects a determination of translational and rotational position by implementing "two point fixturing." At run time, according to the invention, an image acquisition device captures and effects storage of an image of the non-rigid package in a first area or frame buffer in memory. Using two point fixturing as discussed hereinbefore, the two unique points or characteristics trained for coarse alignment are then located. In the two point fixturing process the coarse alignment points are obtained by locating the trained unique patterns in the stored image by Normalized Correlation, as known in the art, which is the image processing technique of the Cognex Search tool used in this illustrative embodiment. The centers of the models act as the desired points for fixturing using the Search tool (Normalized Correlation). The run time search is done for both these patterns and their centers yield the run time positions. Based on the train time and run time position of these points, the translation and rotational parameters of the subject run time package are computed.

The translation and rotation parameters are used to predict the position of the local alignment points. After determining the translation and rotation parameters, a portion or window within the captured image (stored in the frame buffer in memory), proximate to the local alignment points is processed to rotate the window around the local alignment points in the image back, in accordance with the parameters determined, to provide a working image on which to determine the actual position of the local alignment points. The working image is stored in a heap in memory for further processing to locate the actual position(s). The local alignment point(s) trained are then located to provide an approximate position of geographically grouped boxes. Such a process of limiting the correction for rotation is used also in the fine alignment process, discussed hereinafter, wherein only a window or limited area of the image within which the characteristic of interest is located, is corrected for rotation. In this manner, a more computationally efficient search is effected.

Local Alignment

The hierarchical search methodology implemented in the apparatus according to the invention limits the area of search for a check box by knowing its approximate position as closely as possible. The basic rule is for a check box to derive its reference from a known point as close as possible. The closer the known point is the better is the approximation of the position of the check box, and the higher the likelihood that the box will be found and inspected despite package distortions. In the present hierarchical fixturing scheme every check box can have three types of fixturing: fixturing obtained from the course alignment (which would be very much like the prior art and not enhance efficiency or overcome the difficulties of package warping); fixturing from a point defined explicitly near it (called local alignment); and/or fixturing obtained from a check box nearest to it which has already been processed (called fine alignment, discussed hereinafter). However, it should be noted again that the exact position of the boxes is not obtained by coarse or local alignment.

Local alignment uses the local alignment points trained to get a very close approximation as to the location of a geographic grouping of boxes. Each trained local alignment point also provides the basis, or acts as a root from which to commence the fine alignment process to be discussed. Although coarse alignment information may be used for locating the first box (in the absence of local alignment points), local alignment points provide a mechanism to overcome the affects of local warping, minimizing errors and enhancing searching efficiency on a warped package surface.

The explicitly defined local alignment point is preferably a small, unique pattern very close to one box in a geographic grouping. This pattern is located by Normalized Correlation, which in this illustrative embodiment implementing Cognex vision system tools is provided by the Cognex Search tool. Once a local alignment point is located, the approximate position of its associated geographic grouping of boxes is known. Subsequently, every other box gets its fixturing from another box, during the fine alignment process, unless it has local alignment.

Fine Alignment

Since the object or envelope is not rigid, the exact position of the boxes is not obtained by coarse or local alignment. Those steps can be used however to provide a very good estimate of the position of a box. The estimated position of a first box, i.e. the root of a minimum spanning tree, is determined based on the train time position of that box, the train time position of the local alignment point, and the actual or run time position of the local alignment point. From this information the estimated, run time position of the box is determined resulting in a substantially reduced search area and a substantially greater probability of locating the box.

Based on the estimated run time position of the box, a Generalized Hough Transform (GHT) mechanism is used to locate the actual position of the box, using the box shape information or GHT data stored during training in the logical group data structure 90. In the illustrative embodiment GHT is implemented using the Cognex Contour Finder tool. GHT is used to find the actual location of all of the boxes in the fine alignment process. The first or root box in a tree is found based on a reference derived from the local alignment point.

Figure 8:
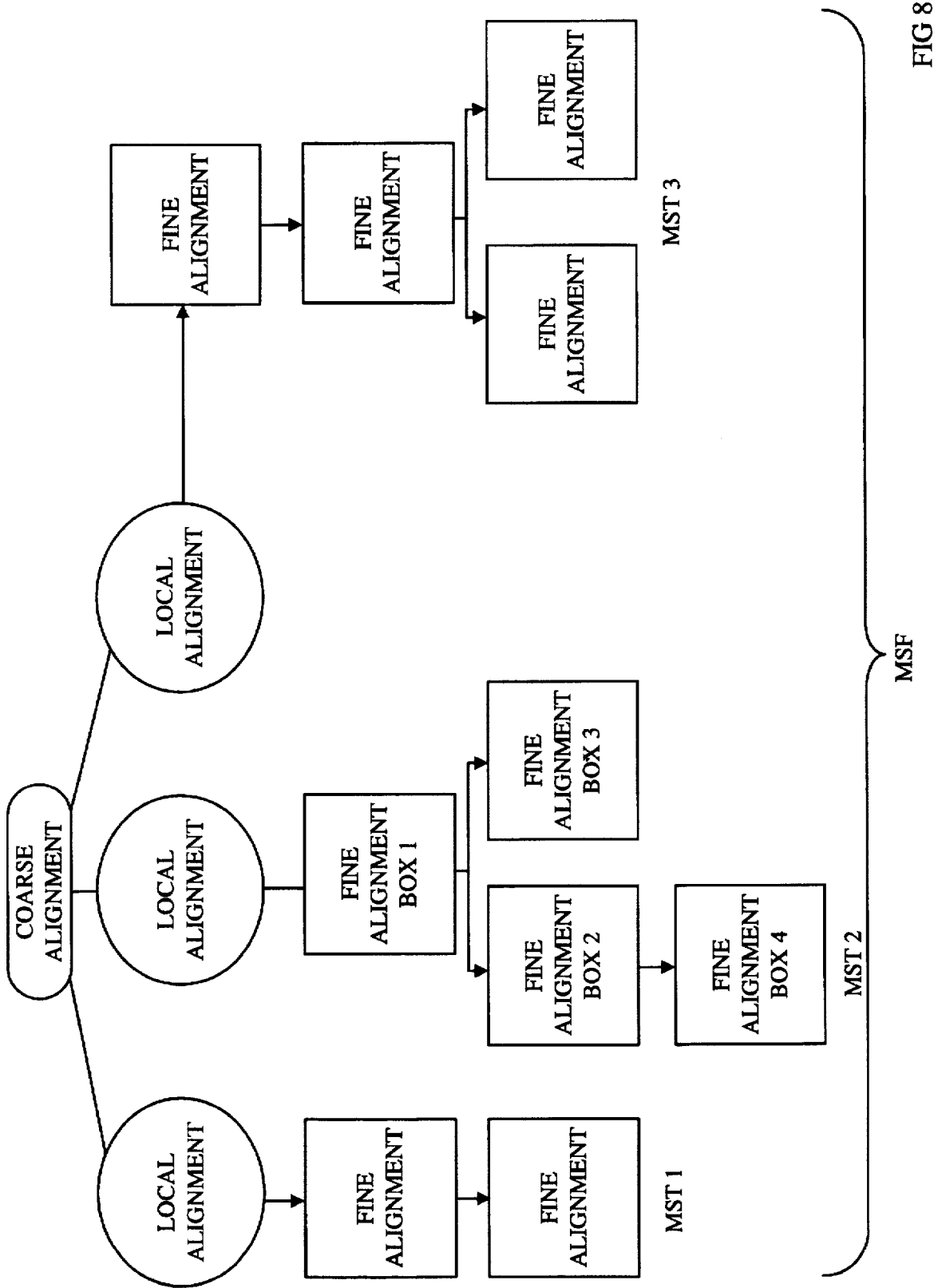
FIG. 8 is diagrammatic illustration of a graph representing a search according to the invention, based from a nearest characteristic of interest as defined in a minimum spanning forest.

The objective then becomes undertaking an order of execution for finding the remaining check boxes, as illustrated in FIG. 8. This order of execution is determined during generation of the minimum spanning forest, and is effected using the pointers stored in the training data structure as discussed hereinbefore. Again, the roots of the trees correspond to the boxes with local alignment, and each node in the tree represents a check box which derives its reference from the previous node (check box). Each tree (MST) in the forest (MSF) itself is constructed by minimizing the sum of distances between the check boxes.

As nodes in the tree, or check boxes, after the root are processed, their estimated position is determined based on the box from which it derives its reference. That is, the estimated position of the box being processed is determined based on the train time position (ideal) of that box, the train time position of the box preceding it in the tree, and the actual position of the box preceding it in the tree. Again, based on the estimated run time position of the box being processed, the Generalized Hough Transform (GHT) mechanism is used to locate the actual position of the box, using the box shape information or GHT data stored during training in the logical group data structure 90. It should be noted that the purpose of using the train time position and the actual or run time position of a previous referent (i.e. local alignment point in the case of the root, or previous box in case of a subsequent box), in determining an estimated position of a box prior to using the GHT in fine alignment, is because it provides rotational information about that area of the package. Thus, prior to using GHT to find the box, the estimated position of the check box is rotated in the opposite direction to compensate for the rotation.

In summary, in the hierarchical implementation according to the invention, once the exact position of a check box is obtained, it can provide a reference to the other check boxes. A data structure is constructed such that every check box can get its reference either from course alignment information, another check box, or an explicitly defined local alignment point. A Minimum Spanning Forest constructed at train time includes a number of trees equal to the number of local alignment points.

At run time, to start with the coarse alignment is obtained. This gives the approximate position of the local alignment points and facilitates correction for rotation and translation. Next, the exact position of the local alignment points are determined. From this the approximate position of the check boxes that were tied to the local alignment point (i.e. which were in its tree) are obtained. Then, by the process of fine alignment, the exact position of the cheek boxes are obtained. Check boxes get their reference from another check box which is the previous check box in the tree as designated by a previous box pointer. The order in which the boxes are located is obtained by a depth-first traversal of the tree, in accordance with a next box pointer, where each parent provides reference to the child. The roots of the trees correspond to the check boxes with local alignment. The tree (MST) itself is constructed by minimizing the sum of distances between the check boxes.

Check Mark Detection

A check mark detection mechanism is implemented in the illustrative embodiment wherein it is desired to determine which check boxes in a group of boxes are checked. Once the exact location of the box is determined, several tests are performed by the vision system toward the end of effecting detection for a check mark. Generally, this is an inspection step to obtain data to use to determine the presence/absence of the check mark. This inspection or detection is done to evaluate a number of parameters related to the box, including average grey level value, number of edges inside the box and a "shape score". As the parameters are determined or computed, they are stored in respective fields within the respective individual box data structure 100 (FIG. 6)

After all the boxes are located and data is determined during the inspection, a scoring function is then used to obtain a final score. Any box with a score greater than a scoring threshold is considered to be a box with a check mark.

One of three parameters considered in this implementation is the average (mean) af the gray level value, as known in the art, inside the box. Grey level as known in the art relates to a grey scale wherein gradations from black to white are assigned values (i.e. in a 6 bit system black=0, white=63 with gradations of grey therebetween being assigned respective incremental values). This measure is particularly useful when the boxes tend to be very small and the check marks tend to fill the entire box. In such cases, there is no edge information inside the box making this measure even more useful, and dictating that it be given greater weight in the scoring function. Edge information, as understood by those skilled in the machine vision art, is information indicative of the variation in intensity over a certain threshold, of a pixel in an image. In some cases there will be little or no variation in intensity of the pixels representing the area of the image inside the box. Generally, the smaller the measure of average grey value, the higher the probability that the box is checked. The pitfall of using this measure is that it becomes sensitive to excessive shadow due to the warping of the boxes, thus in some cases (i.e. where the check box is big) it may be desirable to give this parameter lesser weight.

The edge count parameter measures the number of the edges inside the box, as known in the art (edge_count). This is useful in almost all cases. Again, an "edge" as known in the art is a variation in intensity over a certain threshold of a pixel in an image. It may be desirable to reduce the area in which the edges are counted (i.e. away from the boundary of the box), so that if the box is warped or if the fine alignment is slightly off, the boundary pixels are not counted.

Shape score or value is the third parameter weighed in the scoring function. Shape score is a comparison between the numeric representation of the exemplary box shape stored in the training data structure and the run time or actual contour or shape of the run time box image found. The closer the numeric value of the run time image is to the trained image, the greater the likelihood is that the box is not checked (assuming that the trained envelope boxes were not checked). The shape score values used in the illustrative embodiment using Cognex machine vision tools are between 0 and 1000, with a score of 1000 indicating a close match between the trained and run time images.

The three parameters can be relatively weighted based on considerations, such as the size of the boxes being inspected, and combined in by an equation to determine a score for each box. The overall score for each box will also be stored in the individual box data structure for an ultimate comparison.

The scoring scheme used to get the overall or final score for a box (denoted as score) is as follows:

$$score = a* (F(nom\_avg-mean)) + b* (F(edge\_count-nom\_edg) + c* (F(nom\_ss-score);$$

where a is the weighting for the average;

mean is the average value measured;

nom_avg is the nominal average value set;

b is the weighting for the edge count;

edge_count is the number of edges measured;

nom_edg is the nominal value of the edge count;

c is the weighting for shape value;

nom_ss is a nominal shape score set;

score is shape score calculated;

F is a function such that;

$$F(x) = x \text{ for } x > 0$$
$$= 0 \text{ for } x < 0.$$

The nominal average value is set such that anything below it is considered potentially a check mark. The nominal edge value is set such that anything above it is considered potentially a check mark. This value in most cases is zero;

however, for boxes with letters and numbers in them, this value is non-zero. The nominal shape score is set in this illustrative embodiment to be between 800 and 1000, with 1000 indicating a perfect match. The reason for the weighting scheme is to bias a specific parameter. For example, for the smaller boxes, the edge count parameter is given a greater bias (by increasing b relative to a). This is because in the presence of shadow, the whole box could become dark making the average value not very reliable. On the other hand, for boxes with numbers and letters, the number of edges is not a very constant quantity due to the arbitrary warping possible. Therefore, in such cases, the average value parameter may be given a greater weighting.

Once the score for each check box is computed, then the presence/absence of a check mark can be reported. All check boxes that are greater than a threshold are classified as having check marks. The value of the scoring threshold may be set relatively high in this case.

In situations, such as with the type of film boxes on the film envelope (FIG. 1), the boxes are mutually exclusive. That is, only one of the boxes will be checked all others will be unchecked. In such cases, a label is used, which is a unique number assigned to each logical group of boxes at train time, stored in the training data structure. In the system according to the invention a Mutual Exclusion constraint can be enabled which provides that only one check box of a given label should be determined to be checked. This makes the check mark detection a lot more robust, given the fact of reliance on relative rather than absolute numbers, especially in the presence of shadows due to excessive warping. If the mutually exclusive constraint is enabled, then the maximum score for each label or group is computed. If the maximum label score is greater than the scoring threshold, then the check box with the maximum score is classified as having a check mark.

Although the invention is described herein in the context of a method and apparatus for locating and inspecting check boxes on a non-rigid film envelope, it will be appreciated that the hierarchical implementation of the method and apparatus according to the invention can be implemented to inspect various other types of non-rigid packages, and it may be implemented in other vision inspection systems, such as mail order processing, non-rigid packages with check lists, or the like. Likewise, various other types of entities of interest, other than check mark boxes, can be located and inspected according to the invention.

While a Generalized Hough Transform mechanism is described herein for effecting fine alignment, it should be appreciated that a number of different approaches known in the machine vision art may be considered for determining the exact location of the entities of interest after determining their estimated position according to the hierarchical methodology of the invention, including, normalized correlation, other pattern matching algorithms or mechanisms, or the like.

While the illustrative embodiment herein is described using a vision system and modular tools from Cognex Corporation, it will be appreciated that other vision tool products can be used in implementing the hierarchical alignment scheme according to the invention. Likewise, the normalized correlation tool (Search) and the Generalized Hough Transform tool (Contour Finder), can be implemented as other than modular tools configured as off the shelf tools incorporated for a variety of applications. For example, the coarse, fine and local alignment features and aspects can be coded in any of various programming languages as stand-alone or integrated modules including pattern recognition functionality.

Furthermore, although particular data structures are described herein, such as arrays of pointers (for the envelope type data structure etc.) and doubly linked lists (for the Minimum Spanning Tree), it will be appreciated that various other data constructs and configurations could be implemented, such as multidimensional arrays, tables and matrices or the like.

Although the invention is shown and described with respect to an illustrative embodiment thereof, it will be appreciated that the foregoing and various other changes, omissions and additions in the form and detail thereof.

What is claimed is:

1. A method of implementing a machine vision system to locate and inspect at least one alignment feature and at least two characteristics of interest on a surface of an object, said method comprising the steps of:

storing information related to a model of said object, said at least one alignment feature, and each of said at least two characteristics of interest in memory accessible to said vision system, said information related to said model of said object including an image of said object, said information related to said at least one alignment feature including ideal position information of said at least one alignment feature on said model of said object, and said information related to said at least two characteristics of interest including an ideal position of each of said at least two characteristics of interest on said model of said object;

inter-relating in said memory said at least one alignment feature and each of said at least two characteristics of interest to effect an order of locating and inspecting each of said at least two characteristics of interest by reference to a respective nearest one of said at least two characteristics of interest, said order requiring that a first one of said at least two characteristics of interest located nearest said at least one alignment point is located first in said order and a second one of said at least two characteristics of interest located nearest said first one is located second in said order; and sequentially locating with said machine vision system each of said at least two characteristics of interest on said surface of said object by determining an actual location of said at least one alignment feature, and determining an actual location of said first one of said at least two characteristics of interest as a function of said ideal position information of said at least one alignment feature and said actual location of said at least one alignment feature, and determining an actual location of said second one of said at least two characteristics of interest as a function of said ideal position of said first one of said at least two characteristics of interest and said actual location of said first one of said at least two characteristics of interest.

2. The method of claim 1 wherein said step of inter-relating said at least one alignment feature and each of said at least two characteristics of interest involves constructing a data structure to inter-relate said at least one alignment feature and each of said at least two characteristics of interest to effect said order of locating and inspecting, said data structure including pointer information associated with a respective one of said first and second at least two characteristics of interest, said pointer information including a first pointer to a first closest characteristic of interest and a second pointer to a second closest characteristic of interest.

3. The method of claim 2 wherein said data structure is a doubly linked list and said first pointer points to a characteristic of interest immediately preceding said respective one of said first and second at least two characteristics of interest in said doubly linked list and said second pointer points to a characteristic of interest immediately following said respective one of said first and second at least two characteristics of interest in said doubly linked list.

4. The method of claim 1 wherein said object is a non-rigid package and said surface of said object is a contorted surface of said non-rigid package subject to warping, wherein said at least one alignment feature includes at least one coarse alignment feature and a local alignment feature proximate to said at least two characteristics of interest and wherein said step of sequentially locating each of said at least two characteristics of interest involves a hierarchical alignment process including:

- a coarse alignment to determine rotation and translation parameters of an actual location of said at least one coarse alignment feature in relation to ideal position information of said at least one coarse alignment feature;
- a local alignment to determine an exact position of said local alignment feature proximate to said at least two characteristics of interest; and
- a fine alignment to determine an exact position of said at least two characteristics of interest in accordance with said order of locating and inspecting each of said at least two characteristics of interest by reference to a respective nearest one of said at least two characteristics of interest.

5. The method of claim 4 wherein said order of locating and inspecting each of said at least two characteristics of interest by reference to a respective nearest one of said at least two characteristics of interest is effected by at least one minimum spanning tree mechanism in which said exact position of said local alignment feature is associated with a root and said actual location of said first one of said at least two characteristics of interest is determined as a function of said exact position of said local alignment feature and said ideal position information of said at least one alignment feature, and said actual location of said second one of said at least two characteristics of interest is determined as a function of said ideal position of said first one of said at least two characteristics of interest and said actual location of said first one of said at least two characteristics of interest.

6. The method of claim 4 wherein said at least one coarse alignment feature comprises at least a first and a second coarse alignment feature mutually diagonally disposed on said surface of said non-rigid package and said coarse alignment involves a two point fixturing process in which ideal position information related to position of each of said first and said second coarse alignment feature is stored in said memory, and actual position information related to position of each of said first and said second coarse alignment feature is determined to derive rotation and translation parameters of said object relative to said model of said object during said coarse alignment.

7. The method of claim 4 wherein said at least one coarse alignment feature comprises at least a first, a second and a third coarse alignment feature mutually diagonally disposed on said surface of said non-rigid package and said coarse alignment involves a two point fixturing process in which two of said first, said second and said third coarse alignment feature are used for said two point fixturing and a remaining one of said first, said second and said third coarse alignment feature is used as a backup if one of the two of said first, said second and said third coarse alignment features can not be found.

8. The method of claim 4 wherein said at least two characteristics of interest are at least two check boxes on said contorted surface of said non-rigid package and said method further includes the step of inspecting each of said at least two check boxes to determine if at least one of said at least two check boxes is checked.

9. The method of claim 8 wherein said step of inspecting involves a check mark detection mechanism that evaluates parameters associated with each of said at least two check boxes, including an average grey level value, a number of edges inside each of said at least two check boxes, and a shape score which is a numeric comparison between a model of a box stored in said memory and a respective one of each of said at least two check boxes.

10. The method of claim 9 wherein each of said parameters is used in an equation to determine a box score, and wherein each of said parameters is weighted in said equation by a weighting factor.

* * * * *